(12) United States Patent
Yamashita et al.

(10) Patent No.: US 10,395,534 B2
(45) Date of Patent: Aug. 27, 2019

(54) OPERATION MANAGEMENT DEVICE, OPERATION MANAGEMENT METHOD AND OPERATION MANAGEMENT SYSTEM

(71) Applicant: ISUZU MOTORS LIMITED, Shinagawa-ku, Tokyo (JP)

(72) Inventors: Akira Yamashita, Kawasaki (JP); Keisuke Kimura, Kawasaki (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 16/100,066

(22) Filed: Aug. 9, 2018

(65) Prior Publication Data

US 2019/0051176 A1 Feb. 14, 2019

(30) Foreign Application Priority Data

Aug. 10, 2017 (JP) .................................. 2017-154951

(51) Int. Cl.
*G08G 1/13* (2006.01)
*G01S 5/00* (2006.01)
*G08G 1/00* (2006.01)

(52) U.S. Cl.
CPC .............. *G08G 1/13* (2013.01); *G01S 5/0027* (2013.01); *G08G 1/20* (2013.01)

(58) Field of Classification Search
CPC .............. G01C 21/367; G01C 21/3626; G01C 21/343; G01C 21/3629; G01C 21/3461;
(Continued)

(56) References Cited

U.S. PATENT DOCUMENTS 4,760,531 A * 7/1988 Yasui ................... G09B 29/106
340/990
4,963,864 A * 10/1990 Iihoshi ................... G01C 21/30
340/990
(Continued)

FOREIGN PATENT DOCUMENTS

JP 2008-174344 A 7/2008

OTHER PUBLICATIONS

"Isuzu carries out full model change of commercial vehicle telematics "Mimamori"", Published May 8, 2017, English language machine translation provided; URL: http://www.isuzu.co.jp/press/2017/5_8prs.html.; 6 pages.

*Primary Examiner* — Hoi C Lau
(74) *Attorney, Agent, or Firm* — Procopio, Cory, Hargreaves & Savitch LLP (57) ABSTRACT

An operation management device including: a setting information acquisition unit configured to acquire selected vehicle information set in a user terminal and indicating a selected vehicle selected from a plurality of vehicles; a vehicle information acquisition unit configured to acquire position information and time information at predetermined time intervals, the position information indicating positions of each of the plurality of vehicles, and the time information indicating time at which the position information is acquired, and a display control unit configured to display, on the user terminal, a map image and a position image that is overlapped on the map image, the position image indicating a plurality of positions indicated by the position information corresponding to the selected vehicle, and the position image being displayed in a mode that is determined based on the time indicated by time information.

8 Claims, 5 Drawing Sheets

(58) Field of Classification Search
CPC .......... G01C 21/3476; G01C 21/3464; G01C 21/3469; G01C 21/3468; G01C 21/20; G01C 21/26; G01C 21/30; G01C 21/32; G01C 21/36; G01C 21/3682; G01C 21/3664; G01C 21/3484; G01C 21/3415; G08G 1/13; G08G 1/20
See application file for complete search history.

(56) References Cited

U.S. PATENT DOCUMENTS

| | | | | |
|---|---|---|---|---|
| 5,266,948 A * | 11/1993 | Matsumoto | G01C 21/30 | 340/990 |
| 5,612,881 A * | 3/1997 | Moroto | G01C 21/3626 | 340/990 |
| 5,842,147 A * | 11/1998 | Nimura | G01C 21/3629 | 701/443 |
| 8,095,308 B2 * | 1/2012 | Tsuji | G01C 21/30 | 701/437 |
| 8,639,409 B2 * | 1/2014 | Ramaswamy | H02J 3/06 | 701/31.5 |
| 2003/0060974 A1 * | 3/2003 | Miyahara | G08G 1/096811 | 701/533 |
| 2004/0024523 A1 * | 2/2004 | Uotani | G01C 21/3461 | 701/411 |
| 2004/0034464 A1 * | 2/2004 | Yoshikawa | G08G 1/096716 | 701/117 |
| 2004/0210388 A1 * | 10/2004 | Sugiura | G01C 21/26 | 701/533 |
| 2006/0025924 A1 * | 2/2006 | Yoshikawa | G01C 21/3476 | 701/533 |
| 2006/0129636 A1 * | 6/2006 | Matsuura | G01C 21/3682 | 709/203 |
| 2007/0078599 A1 * | 4/2007 | Yoshioka | G01C 21/367 | 701/454 |
| 2007/0126698 A1 * | 6/2007 | Iwamoto | G01C 21/3664 | 345/156 |
| 2007/0198184 A1 * | 8/2007 | Yoshioka | G01C 21/32 | 701/426 |
| 2008/0162033 A1 * | 7/2008 | Wagner | G01C 21/367 | 701/533 |
| 2009/0063048 A1 * | 3/2009 | Tsuji | G01C 21/30 | 701/455 |
| 2011/0208422 A1 * | 8/2011 | Nakano | G01C 21/36 | 701/467 |
| 2012/0078513 A1 * | 3/2012 | Oaki | G01C 21/3664 | 701/527 |
| 2012/0209506 A1 * | 8/2012 | Tamayama | G01C 21/343 | 701/410 |
| 2012/0253548 A1 * | 10/2012 | Davidson | G06Q 10/08 | 701/1 |
| 2012/0253587 A1 * | 10/2012 | Davidson | G06Q 10/08 | 701/29.3 |
| 2013/0116923 A1 * | 5/2013 | Terai | G01C 21/20 | 701/519 |
| 2014/0163877 A1 * | 6/2014 | Kiyama | G01C 21/3469 | 701/533 |
| 2015/0226570 A1 * | 8/2015 | Takei | G01C 21/3484 | 701/454 |
| 2016/0273930 A1 * | 9/2016 | Wada | G01C 21/3438 | |
| 2017/0082449 A1 * | 3/2017 | Suzuki | G01C 21/3461 | |
| 2017/0108341 A1 * | 4/2017 | Dewis | G01C 21/3415 | |
| 2018/0066960 A1 * | 3/2018 | Tateishi | G01C 21/30 | |
| 2019/0051176 A1 * | 2/2019 | Yamashita | G08G 1/13 | |

\* cited by examiner

OPERATION MANAGEMENT DEVICE, OPERATION MANAGEMENT METHOD AND OPERATION MANAGEMENT SYSTEM

STATEMENT REGARDING PRIOR DISCLOSURES BY THE INVENTORS

The inventors of the present application authored and disclosed the subject matter of the present application on May 8, 2017. The prior disclosures have been submitted in an Information Disclosure Statement in the present application as "Isuzu carries out full model change of commercial vehicle telematics "MIMAMORI" (Published May 8, 2017; retrieved on Jul. 25, 2018; English language machine translation provided); URL: http://www.isuzu.co.jp/press/2017/5_8prs.html".

CROSS-REFERENCE TO RELATED APPLICATIONS

This application claims priority from Japanese Patent Application No. 2017-154951 filed on Aug. 10, 2017, the entire contents of which are incorporated herein by reference.

TECHNICAL FIELD

The present disclosure relates to an operation management device, an operation management method and an operation management system for managing operation of a vehicle.

BACKGROUND

Regarding operation management of a vehicle, a technology with which it is possible to check a traveled route of the vehicle on a screen of a terminal such as a computer has been known. For example, JP-A-2008-174344 discloses a technology in which a server acquires position information of a vehicle in association with time and displays a traveled route of the vehicle on the basis of the acquired position information on a screen of a terminal.

According to the above technology, an image indicative of the traveled route of the vehicle is displayed in a linear shape. A user who visually recognizes the image indicative of the route can perceive on which route the vehicle has traveled by visually recognizing the image. However, even though the vehicle travels on the same route, the vehicle may travel on schedule or may not travel on schedule due to unscheduled troubles such as a traffic jam and a breakdown of the vehicle. Even when the traveled route of the vehicle is displayed by the liner-shaped image like the above technology, it is difficult to perceive a change in traveling state of the vehicle.

SUMMARY

The present disclosure has been made in view of the above situations, and an object thereof is to provide an operation management device, an operation management method and an operation management system capable of easily perceiving a change in traveling state of a vehicle.

A first aspect of the present disclosure is an operation management device including: a setting information acquisition unit configured to acquire selected vehicle information set in a user terminal and indicating a selected vehicle selected from a plurality of vehicles; a vehicle information acquisition unit configured to acquire a plurality of pieces of position information and a plurality of pieces of time information at predetermined time intervals, the plurality of the pieces of position information indicating positions of each of the plurality of vehicles, and each of the plurality of the pieces of time information indicating time at which each of the plurality of the pieces of position information is acquired, and a display control unit configured to display, on the user terminal, a map image and a position image that is overlapped on the map image, the position image indicating a plurality of positions indicated by the plurality of pieces of position information corresponding to the selected vehicle indicated by the selected vehicle information acquired by the setting information acquisition unit, and the position image being displayed in a mode that is determined based on the time indicated by each of plurality of pieces of time information.

A second aspect of the present disclosure is an operation management method including: acquiring selected vehicle information set in a user terminal and indicating a selected vehicle selected from a plurality of vehicles; acquiring a plurality of pieces of position information and a plurality of pieces of time information at predetermined time intervals, the plurality of pieces of position information indicating a position of each of the plurality of vehicles, and each of the plurality of pieces of time information indicating time at which the each of the plurality of pieces of position information is acquired, and displaying, on the user terminal, a map image and a position image that is overlapped on the map image, the position image indicating a plurality of positions indicated by the plurality of pieces of position information corresponding to the selected vehicle indicated by the acquired selected vehicle information, and the position image being displayed in a mode that is determined based on the time indicated by each of the plurality of pieces of time information.

A third aspect of the present disclosure is an operation management system including: a user terminal including a display unit, and an operation management device configured to display a position of a vehicle on the user terminal, the operation management device including: a setting information acquisition unit configured to acquire selected vehicle information set in the user terminal and indicating a selected vehicle selected from a plurality of vehicles, and a vehicle information acquisition unit configured to acquire a plurality of pieces of position information and a plurality of pieces of time information at predetermined tune intervals, the plurality of pieces of position information indicating positions of each of the plurality of vehicles, and each of a plurality of pieces of time information indicating time at which each of plurality of pieces of position information is acquired, and wherein the display unit is configured to display, on the user terminal, a map image and a position image that is overlapped on the map image, the map image indicating a plurality of positions indicated by the plurality of pieces of position information corresponding to the selected vehicle indicated by the selected vehicle information acquired by the setting information acquisition unit, and the position image being displayed in a mode that is determined based on the time indicated by each of plurality of pieces of time information.

DETAILED DESCRIPTION

[Outline of Operation Management System S]

Figure 1:
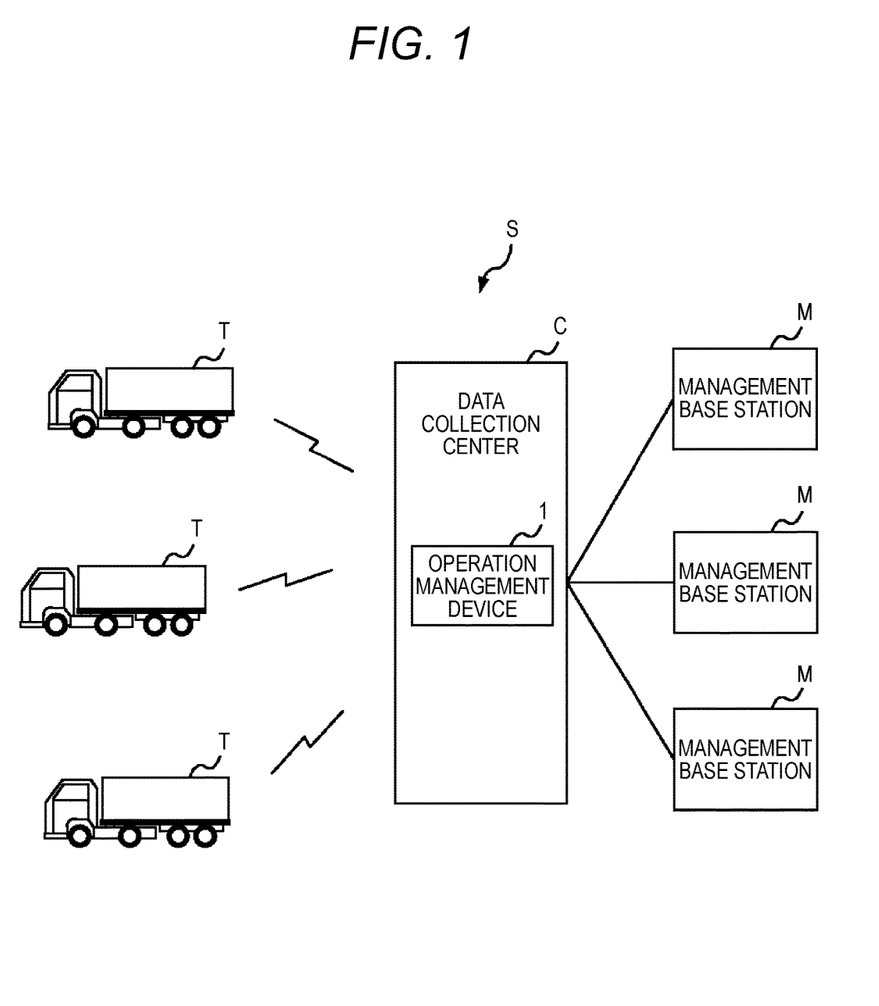
FIG. 1 is a pictorial view of an operation management system.

FIG. 1 is a pictorial view of an operation management system S in accordance with an illustrative embodiment. The operation management system S is a system in which an operation management device 1 and a vehicle T are configured to manage operation of the vehicle T in conjunction with each other. The operation management device 1 is installed in a data collection center C configured to collect data indicative of positions of a plurality of vehicles T. The operation management device 1 is connected to the plurality of vehicles T registered in advance in the operation management device 1 via wireless communication lines, and is configured to receive data indicative of positions of the vehicles T at predetermined time intervals from the respective vehicles T. The operation management device 1 is configured to manage operation of the vehicle T, based on the data indicative of the position received from the vehicle T.

The operation management device 1 is connected to a user terminal 2 via a network (for example, the Internet). The user terminal 2 is used by a user such as a manager who manages the vehicle T or a cargo owner of a cargo that is carried by the vehicle T. The user terminal 2 may be provided to an equipment of a company to which the vehicle T belongs or an equipment of a company that maintains the vehicle T. The user terminal 2 also may be provided to an equipment of a cargo owner of a cargo that is carried by the vehicle T. The user terminal 2 is configured to display a trajectory image indicative of a trajectory along which the vehicle T, which the user wants to check an operation state thereof, has traveled within a predetermined time period, in accordance with a user's input.

[Display Screen]

Figure 2:
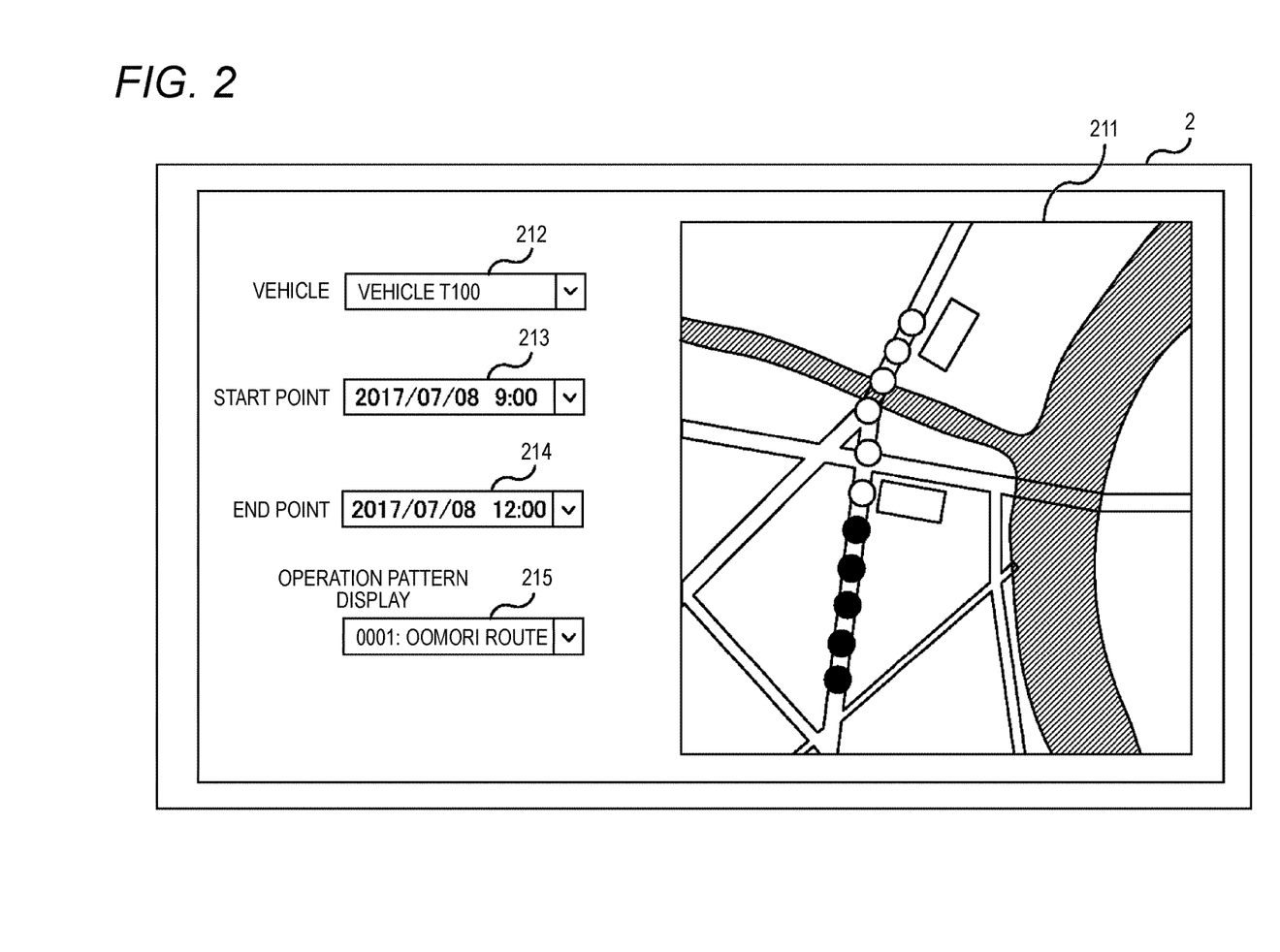
FIG. 2 depicts an example of a screen that is displayed on a user terminal.
Figure 3:
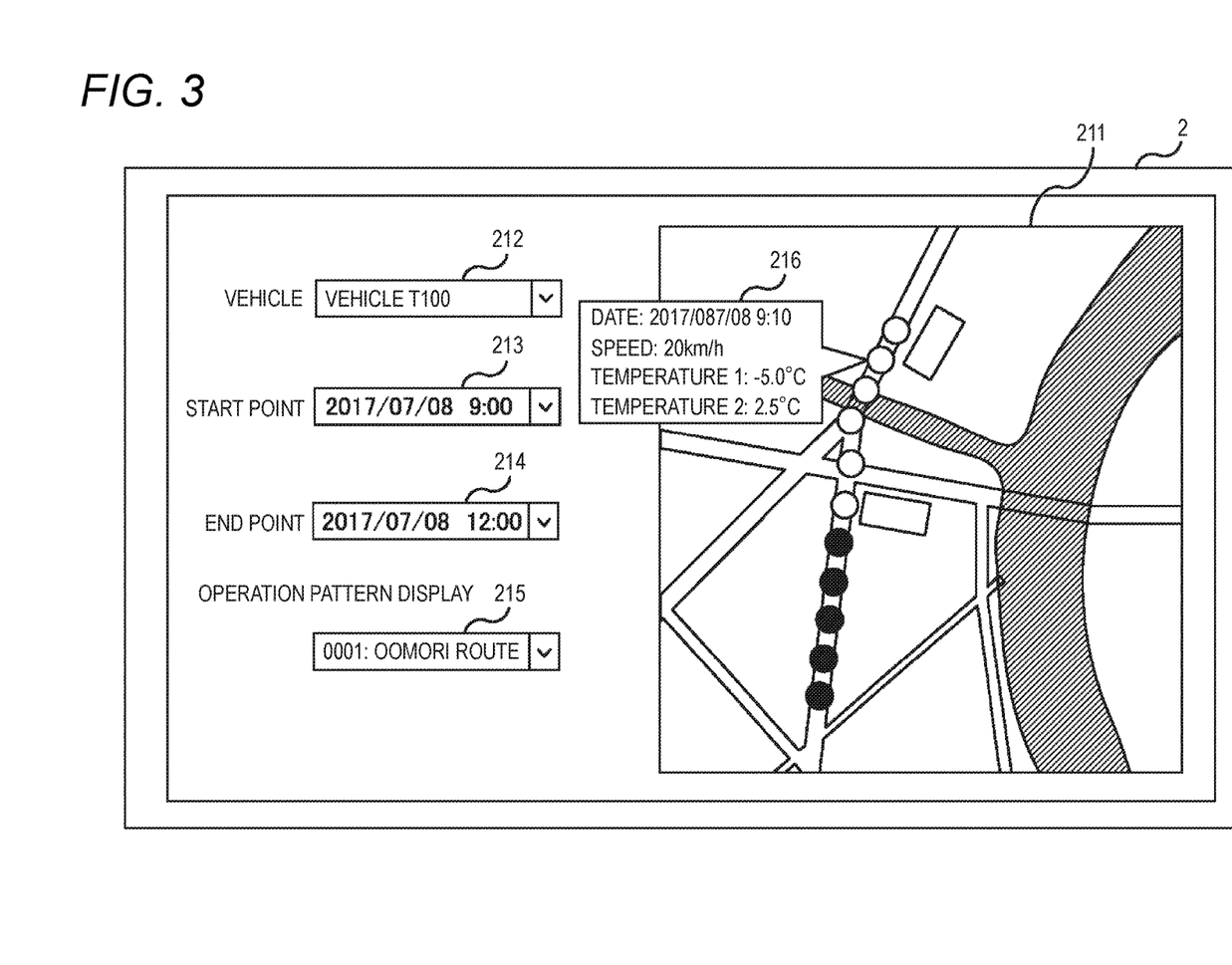
FIG. 3 depicts an example of the screen that is displayed on the user terminal.

FIGS. 2 and 3 depict an example of a screen that is displayed on the user terminal 2. In FIG. 2, a map image 211, a vehicle selection region 212, a start point setting region 213, an end point setting region 214, and an operation pattern setting region 215 are displayed.

In the map image 211, a traveling trajectory of the vehicle T is shown by white circles and black circles on a road. In FIG. 2, positions of the vehicle T are displayed in a state where some of positions indicated by a plurality of pieces of position information (for example, latitude and longitude information) acquired from the vehicle T are sorted.

In FIGS. 2 and 3, the white circles indicate a traveling trajectory within a first time period (for example from 9:00 to 9:10), which is a first period after the vehicle T starts to travel, and the black circles indicate a traveling trajectory within a second time period (for example from 9:10 to 9:20), which is a second period after the vehicle T starts to travel. Like this, the operation management system S has a feature that a mode of an image indicative of the traveling trajectory changes over time. The mode of the image indicative of the traveling trajectory is a color, a shape or a size of the image, for example.

The vehicle selection region 212 is a region for selecting the vehicle T, of which the traveling trajectory is displayed on the user terminal 2, from one or more vehicles T that the user can display the traveling trajectory thereof. When the user pushes a pull-down mark provided at a right end of the vehicle selection region 212, vehicle identification information for specifying one or more vehicles T registered in advance is displayed. The user can select the vehicle T of which a traveling trajectory is displayed by selecting one vehicle identification information from the vehicle identification information of one or more vehicles T. The vehicle selection region 212 may be configured to select a plurality of vehicles T by the user.

The start point setting region 213 is a region for setting a date, which is a start point of the traveling trajectory when the traveling trajectory of the vehicle T selected in the vehicle selection region 212 is displayed. Also, the end point setting region 214 is a region for setting a date, which is an end point of a traveling trajectory when the traveling trajectory of the vehicle T selected in the vehicle selection region 212 is displayed. In FIG. 2, the start point and the end point are set so that a traveling trajectory from A.M. 9:00 to 12:00 on Jul. 8, 2017 is to be displayed.

The operation pattern setting region 215 is a region for selecting a preset operation pattern. The preset operation pattern includes information about a route set by the user. For example, the preset operation pattern is configured by an aggregate of a plurality of positions associated with elapse time after the vehicle starts from a start position set by the user. The operation pattern may include time at which the vehicle is scheduled to arrive at a predetermined position and time at which the vehicle is scheduled to start from a predetermined position.

When the user selects an operation pattern corresponding to a traveling-scheduled route of the vehicle T of which the operation state is checked, the operation management device 1 can display a screen for comparing the operation state of the vehicle T and the preset operation pattern on the user terminal 2. Also, in the case that the operation pattern includes arrival-scheduled time or start-scheduled time at a predetermined position, when the vehicle T does not arrive at the predetermined position even after the arrival-scheduled time or when the vehicle T does not start from the predetermined position even after the start-scheduled time, the operation management device 1 may transmit a warning notification to the user terminal 2.

FIG. 3 is the same as FIG. 2, except that the detail information region 216 is displayed. When the user adjusts a position of a cursor on the user terminal 2 to a position on the traveling trajectory, the user can check a state of the vehicle T acquired from the vehicle T at the position of the cursor. In the detail information region 216, for example, a date, a traveling speed of the vehicle T, and a temperature of a cargo space of the vehicle T are displayed. The cargo space of the vehicle T includes a refrigerator or a freezer in which a cargo can be stored, for example.

[Configuration of Operation Management System S]

Figure 4:
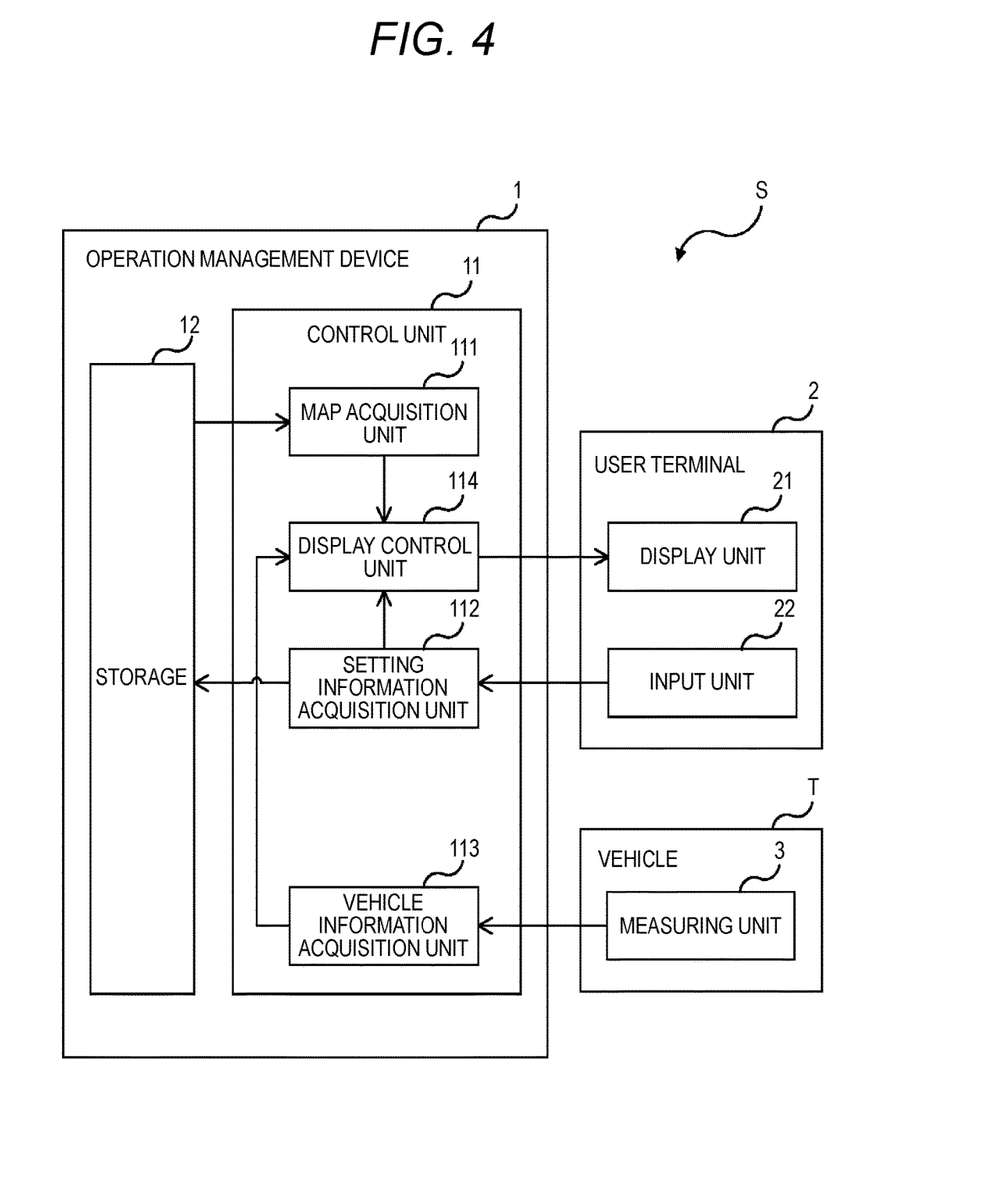
FIG. 4 is a block diagram of the operation management system.

FIG. 4 is a block diagram of the operation management system S in accordance with the illustrative embodiment. In FIG. 4, the arrow indicates a flow of main data. There may be a flow of data except those shown in FIG. 4. In FIG. 4, each block indicates a configuration of a functional unit, not a configuration of a hardware (device) unit. Therefore, the blocks shown in FIG. 4 may be mounted in a single device or may be mounted separately in multiple devices. The communication of data between the blocks may be performed via any means such as a data bus, a network, a portable storage medium and the like.

The user terminal 2 includes a display unit 21 and an input unit 22. The display unit 21 includes any display device capable of displaying information received from the operation management device 1 for the user, such as a liquid crystal monitor, an organic electroluminescence (EL) (OLED; Organic Light Emitting Diode) display, and the like. The input unit 22 includes any input device capable of receiving an input from the user, such as a keyboard, a mouse and the like. Also, the display unit 21 and the input unit 22 may be integrally configured by using a touch screen as the display unit 21. The input unit 22 is configured to transmit input information which indicates the input from the user to the operation management device 1 via the network. Also, the user terminal 2 may further include a speaker configured to output voice and a lamp configured to output light.

The vehicle T includes a measuring unit 3. The measuring unit 3 includes a GPS (Global Positioning System) receiver, for example, and is configured to measure a position of the vehicle T by receiving signals from GPS satellites. The measuring unit 3 is configured to transmit position information which indicates the measured position of the vehicle T and time information which indicates time at which the position information is measured to the operation management device 1 by way of a wireless communication line. The measuring unit 3 may be configured to measure a temperature of a predetermined place (for example, an inside of a cargo loading storage) of the vehicle T, and to transmit temperature information indicative of the measured temperature to the operation management device 1.

Also, the measuring unit 3 is configured to measure a speed of the vehicle T and to transmit speed information indicative of the measured speed to the operation management device 1. The measuring unit 3 may be configured to measure the position, temperature and speed at predetermined time intervals. The measuring unit 3 may transmit the vehicle information such as the position information, the temperature information, the speed information and the time information at the point in time of each measurement or integrate and transmit the position information, the temperature information, the speed information and the time information at the multiple points in time.

The operation management device 1 includes a control unit 11 and a storage 12. The control unit 11 includes a map acquisition unit 111, a setting information acquisition unit 112, a vehicle information acquisition unit 113, and a display control unit 114.

The storage 12 is a storage medium including a ROM (Read Only Memory), a RAM (Random Access Memory), a hard disk drive and the like. In the storage 12, programs that are to be executed by the control unit 11 are stored in advance. Also, in the storage 12, map information for displaying map images is stored in advance. Also, in the storage 12, vehicle identification information and operation patterns of one or more vehicles T associated with the user are stored.

The control unit 11 is a processor such as a CPU (Central Processing Unit), and is configured to function as the map acquisition unit 111, the setting information acquisition unit 112, the vehicle information acquisition unit 113 and the display control unit 114 by executing the programs stored in the storage 12. At least some functions of the control unit 11 may be implemented by electric circuits. Also, at least some functions of the control unit 11 may be implemented by a program that is executed over the network.

The specific configurations of the operation management device 1 and the user terminal 2 of the illustrative embodiment are not limited to FIG. 4. The operation management device 1 and the user terminal 2 are not limited to one device, respectively, and may be configured by two or more physically divided devices that are connected in a wired or wireless manner The map acquisition unit 111 is configured to read and acquire map information for displaying the map image 211 shown in FIGS. 2 and 3 from the storage 12. The map acquisition unit 111 may be configured to acquire the map information from an external device via a communication line.

The setting information acquisition unit 112 is configured to acquire various setting information that has been set in the user terminal 2 by the user. The setting information acquisition unit 112 is configured to acquire selected vehicle information and time period information (for example, a start point date and an end point date of the traveling trajectory) which are set in the user terminal 2. The selected vehicle information indicates the vehicle identification information of a selected vehicle selected from the plurality of vehicles T and the time period information indicates a traveling time period of the selected vehicle of which a position image is to be displayed on the user terminal 2. The setting information acquisition unit 112 may be configured to further acquire operation pattern information, which is route information set in the user terminal 2 and indicative of a traveling-scheduled route of the vehicle T. In this case, the setting information acquisition unit 112 may be configured to acquire the route information in which the traveling-scheduled position and the traveling-scheduled time of the vehicle T are associated with each other. The setting information acquisition unit 112 is configured to store the acquired setting information in the storage 12 in association with the user identification information.

The vehicle information acquisition unit 113 is configured to acquire position information, time information, speed information, and temperature information at predetermined time intervals. The position information indicates a position of each of the plurality of vehicles T registered in advance. The time information indicates time at which the position information is acquired. The speed information indicates a speed of the vehicle T. The temperature information indicates a temperature in the cargo loading storage of the vehicle T. The vehicle information acquisition unit 113 is configured to acquire the various information of the vehicle T, which is for example measured at one minute interval, at time interval (for example, at three-minute interval) longer than the measured time interval. The vehicle information acquisition unit 113 may be configured to acquire a plurality of pieces of temperature information indicative of temperatures of the respective multiple places of the vehicle T. The vehicle information acquisition unit 113 is configured to notify the display control unit 114 of the acquired vehicle information. The vehicle information acquisition unit 113 may be configured to store the acquired vehicle information in the storage 12 in association with the vehicle T, and to notify the display control unit 114 of the acquired vehicle information via the storage 12.

The display control unit 114 is configured to display the various information on the display unit 21 of the user terminal 2. The display control unit 114 is configured to display the map image 211, the vehicle selection region 212, the start point setting region 213, the end point setting region 214 and the operation pattern setting region 215 on the display unit 21. The screen of FIGS. 2 and 3 includes the map image 211, the vehicle selection region 212, the start point setting region 213, the end point setting region 214 and the operation pattern setting region 215, for example. Also, the display control unit 114 is configured to display information, which indicates a state of the vehicle T shown in the detail information region 216 of FIG. 3, on the display unit 21, based on the vehicle information acquired by the vehicle information acquisition unit 113.

Also, after the setting information acquisition unit 112 acquires the various setting information, the display control unit 114 displays information which indicates an operation state of the vehicle acquired by the vehicle information acquisition unit 113 on the user terminal 2 based on the setting information stored in the storage 12. For example, the display control unit 114 is configured to display, on the user terminal 2, a map image and a position image that is overlapped on the map image and indicates a plurality of positions during a time period indicated by the time period information acquired by the setting information acquisition unit 112.

Specifically, the display control unit 114 is configured to display, on the user terminal 2, a map image and a position image that is overlapped on the map image. The position image indicates the plurality of positions corresponding to a plurality of pieces of position information acquired from the vehicle T indicated by the selected vehicle information acquired by the setting information acquisition unit 112 and the position image is displayed in a mode that is determined based on time indicated by the time information. At this time, as shown in FIGS. 2 and 3, the display control unit 114 may be configured to display, on the user terminal 2, a map image and a position image that is overlapped on the map image and includes a trajectory line, which is formed by connecting the plurality of positions and differs in color in accordance with time zones including time indicated by the time information.

Also, the display control unit 114 is configured to display the speed information and the temperature information acquired by the vehicle information acquisition unit 113 on the detailed information region 216. For example, as shown in FIG. 3, when the user selects one position on the traveling trajectory, the display control unit 114 displays, on the display unit 21, a map image and the temperature information that is overlapped on the map image at a position associated with a position image of the position, which is selected by the user, of the map image to be displayed on the display unit 21.

When the route information corresponding to an operation pattern selected by the user is acquired from the setting information acquisition unit 112, the display control unit 114 displays, on the user terminal 2, a map image, and a traveling-scheduled route indicated by the route information and a position image that are overlapped on the map image. When the setting information acquisition unit 112 acquires the route information associated with the traveling-scheduled position and traveling-scheduled time of the vehicle T, the display control unit 114 displays, on the user terminal 2, a map image, and a traveling-scheduled position associated with the traveling-scheduled time corresponding to current time and a position of the selected vehicle at the current time that are overlapped on the map image. Since the operation management device 1 is configured in this way, the user can check whether the vehicle T is properly operating, evaluate a driver of the vehicle T and issue an instruction to change a traveling route of the vehicle T.

[Flowchart of Processing of Displaying Traveling Trajectory]

Figure 5:
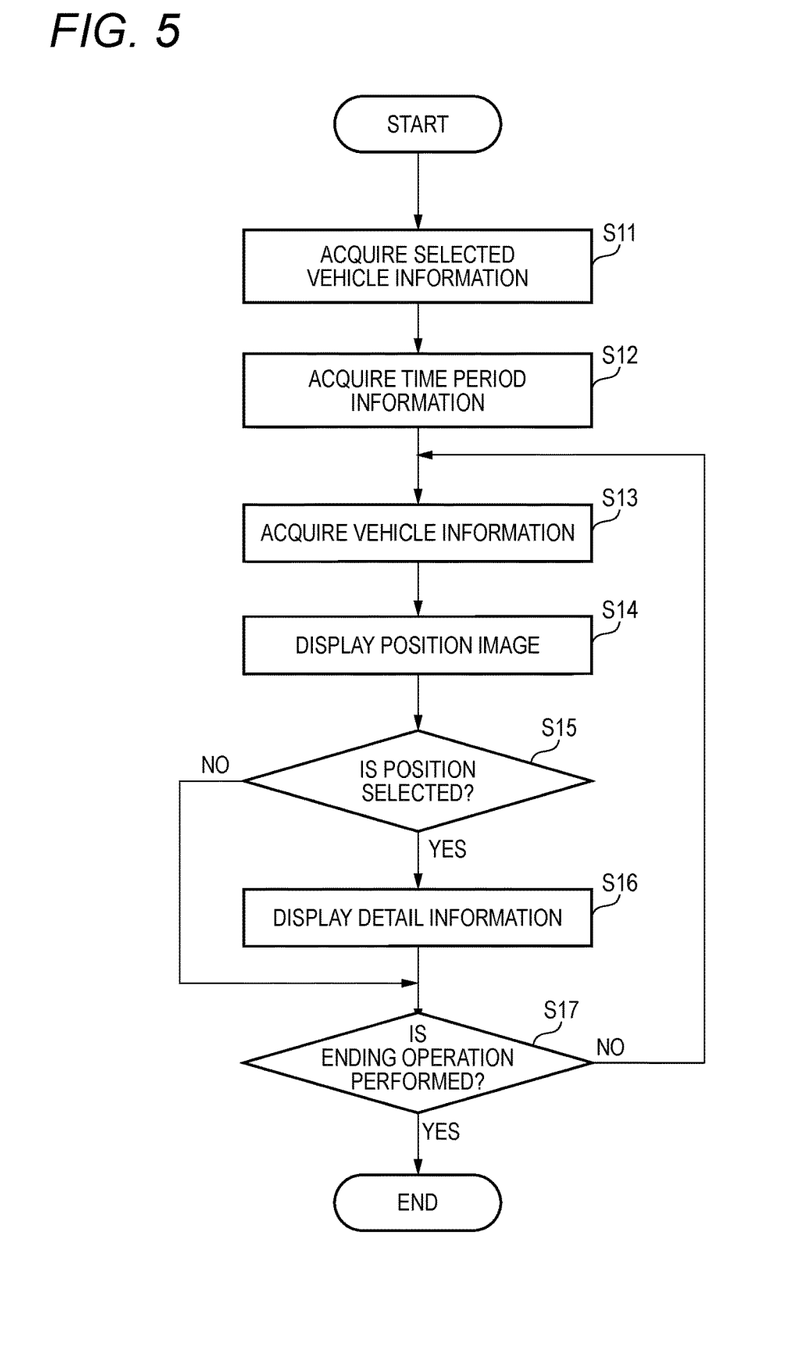
FIG. 5 is a flowchart of processing in which an operation management device displays a traveling trajectory of a vehicle on the user terminal.

FIG. 5 is a flowchart of processing in which the operation management device 1 displays the traveling trajectory of the vehicle T on the user terminal 2. The flowchart of FIG. 5 starts when the user performs a predetermined start operation (for example, a login operation) on the user terminal 2 with the input unit 22, for example.

First, the display control unit 114 displays a screen including the various setting regions shown in FIG. 2 on the display unit 21 of the user terminal 2, and the setting information acquisition unit 112 acquires the selected vehicle information for specifying the vehicle T selected with the user terminal 2 (S11). For example, the selected vehicle information is information including the vehicle identification information of the selected vehicle T. Also, the setting information acquisition unit 112 acquires the time period information for specifying a time period for which the traveling trajectory of the vehicle T is to be displayed (S12). The time period information includes the date information set in the start point setting region 213 and the end point setting region 214 shown in FIG. 2.

Subsequently, the vehicle information acquisition unit 113 acquires the vehicle information such as the position information, the speed information and the temperature information acquired for the vehicle T (S13). The vehicle information acquisition unit 113 notifies the display control unit 114 of the acquired vehicle information, and the display control unit 114 displays a position image such as the white circles and the black circles shown in FIG. 2 at a position on the map image corresponding to the position indicated by the position information with being overlapped on the map image including the position indicated by the position information notified from the vehicle information acquisition unit 113 (S14). At this time, the display control unit 114 displays the position image in different modes for each time zone including the time at which the vehicle T has acquired the position information, for example.

The setting information acquisition unit 112 monitors whether an operation of selecting a part of the displayed position image is performed, in the state where the display control unit 114 displays the position image (S15). When it is detected that the user performs the operation of selecting a part of the position image (YES in S15), the setting information acquisition unit 112 notifies the display control unit 114 of information for specifying the selected position of the position image.

When the information for specifying the selected position is received from the setting information acquisition unit 112, the display control unit 114 displays the vehicle information (the date information, the speed information and the temperature information) corresponding to a notified position on the display unit 21 (S16). When the setting information acquisition unit 112 does not detect the operation of selecting a part of the position image in step S15, the setting information acquisition unit 112 proceeds to step S17.

In step S17, the setting information acquisition unit 112 monitors whether an operation of ending the display of the traveling trajectory is performed on the user terminal 2. When the ending operation is detected (YES in S17), the setting information acquisition unit 112 ends the processing of displaying the traveling trajectory. When the operation of ending is not detected (NO in S17), the setting information acquisition unit 112 repetitively executes the processing from step S13 to S17.

[Effects of Operation Management System S]

As described above, the display control unit 114 of the operation management device 1 displays, on the user terminal 2, the map image and the position image that is overlapped on the map image. The position image indicates the plurality of positions indicated by the plurality of pieces of position information corresponding to the vehicle indicated by the selected vehicle information acquired by the setting information acquisition unit 112 and the position image is displayed in the mode that is determined based on the time indicated by the time information. Since the operation management device 1 is configured in this way, the user can perceive the operation state of the vehicle T at each time zone including different times simply by watching the screen on which the traveling positions are displayed. As a result, the user can perceive a temporal change in operation state of the vehicle T.

Also, the vehicle information acquisition unit 113 is configured to acquire the position information of the vehicle T and the temperature information indicating the temperature in the cargo space of the vehicle T. The display control unit 114 is configured to display, on the user terminal 2, the map image on which the temperature information is overlapped at the position associated with the position image. In this way, a manager of a transport company that monitors the operation of the vehicle T having the cargo space or a cargo owner of a cargo that is carried by the vehicle T can check a temperature state of the cargo space at each traveling position.

Also, the setting information acquisition unit 112 is configured to further acquire the route information (the operation pattern) set in the user terminal 2 and indicating the traveling-scheduled route of the vehicle T, and the display control unit 114 is configured to display, on the user terminal 2, the map image, and the traveling-scheduled route indicated by the route information and the position image that are overlapped. In this way, since the display control unit 114 is configured to display the map image, and the traveling-scheduled route and the position image that are overlapped on the map image, the user can quickly detect that the vehicle T is traveling on a route different from the traveling-scheduled route, and adopt a proper measure.

Also, the display control unit 114 is configured to display the traveling-scheduled route associated with the time information and the position information, together with the position image of which the aspect is determined on the basis of the time. Therefore, the user can perceive at which time zones a discrepancy has occurred between the scheduled traveling and the actual traveling. As a result, the user can detect a behavior problem of the driver and adopt a measure so that the vehicle T can travel in accordance with the scheduled traveling.

Although the present disclosure has been described with reference to the illustrative embodiments, the technical scope of the present disclosure is not limited to the illustrative embodiments. It is obvious to one skilled in the art that the illustrative embodiments can be diversely modified or improved. It is clear from the claims that the modifications or improvements are also included in the technical scope of the present disclosure.

The disclosure provides illustrative, non-limiting examples as follows:

A first aspect of the present disclosure is an operation management device including: a setting information acquisition unit configured to acquire selected vehicle information set in a user terminal and indicating a selected vehicle selected from a plurality of vehicles; a vehicle information acquisition unit configured to acquire a plurality of pieces of position information and a plurality of pieces of time information at predetermined time intervals, the plurality of the pieces of position information indicating positions of each of the plurality of vehicles, and each of the plurality of the pieces of time information indicating time at which each of the plurality of the pieces of position information is acquired, and a display control unit configured to display, on the user terminal, a map image and a position image that is overlapped on the map image, the position image indicating a plurality of positions indicated by the plurality of pieces of position information corresponding to the selected vehicle indicated by the selected vehicle information acquired by the setting information acquisition unit, and the position image being displayed in a mode that is determined based on the time indicated by each of plurality of pieces of time information.

A second aspect of the present disclosure is characterized in that in the first aspect, wherein the display control unit is configured to display, on the user terminal, the map image and the position image that is overlapped on the map image, the position image including a trajectory line that is formed by connecting the plurality of positions and differs in color in accordance with time zones including the time indicated by each of the plurality of pieces of time information.

A third aspect of the present disclosure is characterized in that in the first aspect, wherein the setting information acquisition unit is configured to acquire time period information indicative of a traveling time period of the selected vehicle for which the position image is displayed on the user terminal, and wherein the display control unit is configured to display, on the user terminal, the map image and the position image that is overlapped on the map image, the position image indicating the plurality of positions during the traveling time period indicated by the time period information.

A fourth aspect of the present disclosure is characterized in that in the first aspect, wherein the vehicle information acquisition unit is configured to further acquire a plurality of pieces of temperature information, each of the plurality of pieces of temperature information indicating a temperature, in a cargo space of the vehicle, at which each of the plurality of pieces of position information is acquired, and wherein the display control unit is configured to display, on the user terminal, the map image and at least one temperature information that is overlapped on the map image at a position associated with the position image.

A fifth aspect of the present disclosure is characterized in that in the first aspect, wherein the setting information acquisition unit is configured to further acquire route information set in the user terminal and indicating a traveling-scheduled route of the vehicle, and wherein the display control unit is configured to display, on the user terminal, the map image, and the traveling-scheduled route indicated by the route information and the position image that are overlapped on the map image.

A sixth aspect of the present disclosure is characterized in that in the fifth aspect, wherein the setting information acquisition unit is configured to acquire the route information associated with a traveling-scheduled position and a traveling-scheduled time of the vehicle, and wherein the display control unit is configured to display, on the user terminal, the map image, and the traveling-scheduled position and a position of the selected vehicle that are overlapped on the map image, the traveling-scheduled position that is associated with the traveling-scheduled time corresponding to current time and the position of the selected vehicle at the current time being displayed.

A seventh aspect of the present disclosure is an operation management method including: acquiring selected vehicle information set in a user terminal and indicating a selected vehicle selected from a plurality of vehicles; acquiring a plurality of pieces of position information and a plurality of pieces of time information at predetermined time intervals, the plurality of pieces of position information indicating a position of each of the plurality of vehicles, and each of the plurality of pieces of time information indicating time at which the each of the plurality of pieces of position information is acquired, and displaying, on the user terminal, a map image and a position image that is overlapped on the map image, the position image indicating a plurality of positions indicated by the plurality of pieces of position information corresponding to the selected vehicle indicated by the acquired selected vehicle information, and the position image being displayed in a mode that is determined based on the time indicated by each of the plurality of pieces of time information.

A eighth aspect of the present disclosure is an operation management system including: a user terminal including a display unit, and an operation management device configured to display a position of a vehicle on the user terminal, the operation management device including: a setting information acquisition unit configured to acquire selected vehicle information set in the user terminal and indicating a selected vehicle selected from a plurality of vehicles, and a vehicle information acquisition unit configured to acquire a plurality of pieces of position information and a plurality of pieces of time information at predetermined time intervals, the plurality of pieces of position information indicating positions of each of the plurality of vehicles, and each of a plurality of pieces of time information indicating time at which each of plurality of pieces of position information is acquired, and wherein the display unit is configured to display, on the user terminal, a map image and a position image that is overlapped on the map image, the map image indicating a plurality of positions indicated by the plurality of pieces of position information corresponding to the selected vehicle indicated by the selected vehicle information acquired by the setting information acquisition unit, and the position image being displayed in a mode that is determined based on the time indicated by each of plurality of pieces of time information.

What is claimed is:

1. An operation management device comprising:
    a setting information acquisition unit configured to acquire selected vehicle information set in a user terminal and indicating a selected vehicle selected from a plurality of vehicles;
    a vehicle information acquisition unit configured to acquire a plurality of pieces of position information and a plurality of pieces of time information at predetermined time intervals, the plurality of the pieces of position information indicating positions of each of the plurality of vehicles, and each of the plurality of the pieces of time information indicating time at which each of the plurality of the pieces of position information is acquired, and
    a display control unit configured to display, on the user terminal, a map image and a position image that is overlapped on the map image, the position image indicating a plurality of positions indicated by the plurality of pieces of position information corresponding to the selected vehicle indicated by the selected vehicle information acquired by the setting information acquisition unit, and the position image being displayed in a mode that is determined based on the time indicated by each of plurality of pieces of time information.

2. The operation management device according to claim 1,
    wherein the display control unit is configured to display, on the user terminal, the map image and the position image that is overlapped on the map image, the position image including a trajectory line that is formed by connecting the plurality of positions and differs in color in accordance with time zones including the time indicated by each of the plurality of pieces of time information.

3. The operation management device according to claim 1,
    wherein the setting information acquisition unit is configured to acquire time period information indicative of a traveling time period of the selected vehicle for which the position image is displayed on the user terminal, and
    wherein the display control unit is configured to display, on the user terminal, the map image and the position image that is overlapped on the map image, the position image indicating the plurality of positions during the traveling time period indicated by the time period information.

4. The operation management device according to claim 1,
    wherein the vehicle information acquisition unit is configured to further acquire a plurality of pieces of temperature information, each of the plurality of pieces of temperature information indicating a temperature, in a cargo space of the vehicle, at which each of the plurality of pieces of position information is acquired, and
    wherein the display control unit is configured to display, on the user terminal, the map image and at least one temperature information that is overlapped on the map image at a position associated with the position image.

5. The operation management device according to claim 1,
    wherein the setting information acquisition unit is configured to further acquire route information set in the user terminal and indicating a traveling-scheduled route of the vehicle, and
    wherein the display control unit is configured to display, on the user terminal, the map image, and the traveling-scheduled route indicated by the route information and the position image that are overlapped on the map image.

6. The operation management device according to claim 5,
    wherein the setting information acquisition unit is configured to acquire the route information associated with a traveling-scheduled position and a traveling-scheduled time of the vehicle, and
    wherein the display control unit is configured to display, on the user terminal, the map image, and the traveling-scheduled position and a position of the selected vehicle that are overlapped on the map image, the traveling-scheduled position that is associated with the traveling-scheduled time corresponding to current time and the position of the selected vehicle at the current time being displayed.

7. An operation management method comprising:
acquiring selected vehicle information set in a user terminal and indicating a selected vehicle selected from a plurality of vehicles;
acquiring a plurality of pieces of position information and a plurality of pieces of time information at predetermined time intervals, the plurality of pieces of position information indicating a position of each of the plurality of vehicles, and each of the plurality of pieces of time information indicating time at which the each of the plurality of pieces of position information is acquired, and
displaying, on the user terminal, a map image and a position image that is overlapped on the map image, the position image indicating a plurality of positions indicated by the plurality of pieces of position information corresponding to the selected vehicle indicated by the acquired selected vehicle information, and the position image being displayed in a mode that is determined based on the time indicated by each of the plurality of pieces of time information.

8. An operation management system comprising:
a user terminal including a display unit, and
an operation management device configured to display a position of a vehicle on the user terminal, the operation management device including:

a setting information acquisition unit configured to acquire selected vehicle information set in the user terminal and indicating a selected vehicle selected from a plurality of vehicles, and a vehicle information acquisition unit configured to acquire a plurality of pieces of position information and a plurality of pieces of time information at predetermined time intervals, the plurality of pieces of position information indicating positions of each of the plurality of vehicles, and each of a plurality of pieces of time information indicating time at which each of plurality of pieces of position information is acquired, and wherein the display unit is configured to display, on the user terminal, a map image and a position image that is overlapped on the map image, the map image indicating a plurality of positions indicated by the plurality of pieces of position information corresponding to the selected vehicle indicated by the selected vehicle information acquired by the setting information acquisition unit, and the position image being displayed in a mode that is determined based on the time indicated by each of plurality of pieces of time information.

* * * * *